United States Patent [19]

Muller

[11] Patent Number: 4,688,120

[45] Date of Patent: Aug. 18, 1987

[54] MAGNETIC TAPE APPARATUS WITH INTEGRATED CONTROL MECHANISM

[75] Inventor: Johannes C. A. Muller, Eindhoven, Netherlands

[73] Assignee: U.S. Philips Corporation, New York, N.Y.

[21] Appl. No.: 793,940

[22] Filed: Nov. 1, 1985

[30] Foreign Application Priority Data

Apr. 9, 1985 [NL] Netherlands .......................... 8501028

[51] Int. Cl.$^4$ ........................ G11B 5/027; G11B 5/008
[52] U.S. Cl. ........................................... 360/85; 360/95
[58] Field of Search ................... 360/85, 95, 83–84, 360/93

[56] References Cited

U.S. PATENT DOCUMENTS

| | | | |
|---|---|---|---|
| 3,661,344 | 5/1972 | Nakamura et al. | 360/85 |
| 3,674,942 | 7/1972 | Sugaya et al. | 360/85 |
| 4,562,496 | 12/1985 | Saito et al. | 360/95 |
| 4,563,717 | 1/1986 | Fleck et al. | 360/95 |

FOREIGN PATENT DOCUMENTS

| | | | |
|---|---|---|---|
| 0020006 | 2/1977 | Japan | 360/95 |
| 0138312 | 12/1978 | Japan | 360/95 |

Primary Examiner—Stuart N. Hecker
Assistant Examiner—David J. Severin
Attorney, Agent, or Firm—F. Brice Faller

[57] ABSTRACT

A magnetic-tape apparatus comprises a deck (1) carrying a cylindrical drum system (3) provided with at least one rotatable magnetic head (7). On the deck (1) a sliding plate (31) is guided for rectilinear movement towards and away from the drum system (3). The sliding plate carries at least two mutually spaced tape guides (73 to 76) which lead a length of magnetic tape (84) to the drum system (3) by a movement of the sliding plate (31) towards the drum system (3). The deck (1) carries two winding spindles (12, 13) for winding and unwinding the magnetic tape respectively. The sliding plate (31) is provided with projecting portions (31d) which position the tape guides (73–76) relative to the drum system (3) in the end position of the sliding plate (31). The sliding plate is also provided with guide edges (69, 79), which control two pivotal arms (62, 63) which are arranged on the deck and which carry tape guides (65, 66). A second control groove (60) in the sliding plate (31) controls a pressure-roller lever (32) carrying a pressure roller (34) while a third control groove (31a) controls an idler wheel (26) for driving one of the winding spindles (12, 13).

30 Claims, 12 Drawing Figures

MAGNETIC TAPE APPARATUS WITH INTEGRATED CONTROL MECHANISM

BACKGROUND OF THE INVENTION

The invention relates to a magnetic-tape apparatus, comprising a deck carrying a cylindrical drum system provided with at least one rotatable magnetic head, on which deck a sliding plate carrying at least two mutually spaced tape guides is guided for rectilinear movement towards and away from the drum system. Movement of the sliding plate from an initial position towards the drum system causes a length of magnetic tape to be led towards the drum system, after which movement when the sliding plate is in an end position the magnetic tape is wrapped around a part of the circumference of the drum system by said tape guides. The deck also carries two mutually spaced winding spindles for winding and unwinding the magnetic tape respectively.

A magnetic-tape apparatus of this kind is disclosed in U.S. Pat. No. 3,512,694. This known apparatus comprises a rectilinearly movable sliding plate which by means of the tape guides pulls the magnetic tape over some length out of a cassette containing the magnetic tape and subsequently wraps it around a part of the drum system. Generally, this movement is referred to as "threading in" of the magnetic tape. The reverse operation during which the sliding plate moves back and the tape guides feed the magnetic tape back into the cassette is referred to as "threading out" of the magnetic tape. The sliding plate of the known apparatus controls only these threading-out and threading-in operations. For controlling the other functions of the apparatus, such as pressing the pressure roller against the capstan and switching the drive means, the known apparatus comprises a number of separate control elements. These elements render the known apparatus comparatively intricate and also less suitable for compact construction.

SUMMARY OF THE INVENTION

It is the object of the invention to control a large number of functions of a magnetic tape apparatus of the kind specified in the opening paragraph.

To this end the sliding plate is provided with positioning means which position the tape guides relative to the drum system in the end position of the sliding plate, first control means which control two pivotal arms which are arranged on the deck and which carry tape guides, second control means which control a pressure-roller lever which is arranged on the deck and which carries a pressure roller, and third control means which control an idler wheel for driving a first winding spindle or a second winding spindle.

The sliding plate which carries the tape guides performs the threading-in and threading-out operations of the magnetic tape and in addition carries a plurality of parts which perform miscellaneous functions and which may be integrated with the sliding plate. These functions include the positioning of the tape guides in the end position of the sliding plate by the positioning means, the control of the pivotal arms with the tape guides by the first control means, the control of the pressure roller, arranged on the pressure-roller lever, by the second control means, and the control of the idler wheel for driving one of the winding spindles with the aid of the third control means. Thus, in the apparatus in accordance with the invention a compact and easy-to-assemble control mechanism for the various functions of the apparatus can be obtained, whilst the possiblity of integrating the various parts in the sliding plate enables the number of adjustments to these parts to be minimized. Further, the various control means can be driven centrally by coupling the sliding plate to a motor. A great advantage of this is that the control of the functions of apparatus is now coupled directly to the position of the sliding plate carrying the tape guides. For example, during fast winding this ensures that the magnetic tape is always transported in a correct position relative to the drum system.

A preferred embodiment of the invention is characterized in that in the initial position the sliding plate is situated at least partly in the area between the two winding spindles and at the front side which faces the drum system the sliding plate comprises a wall which is substantially concentric with the drum system. This arrangement of the sliding plate in the area between the two winding spindles and the concentric shape of the front side of the sliding plate ensure that this plate occupies a minimal space in the apparatus. As a result of this, the construction in accordance with the invention is suitable for use in apparatuses of compact construction.

In this respect another preferred embodiment of the invention is characterized in that the bearing means of a servo wheel is situated in the area between the two winding spindles, which servo wheel is elastically coupled to the sliding plate via a first spring coupling for moving the sliding plate. By mounting the bearing means for the servo wheel between the two winding spindles this wheel occupies little additional space and the presence of the first spring coupling enables the sliding plate to be urged into the end position, which is advantageous for a correct positioning of the tape guides by the positioning means.

In connection with the foregoing another preferred embodiment is characterized in that the servo wheel is elastically coupled to the pressure-roller lever via a second spring coupling, which second spring coupling at least at the end of the movement of the sliding plate towards the end position exerts a force on the pressure-roller lever to press the pressure roller against a capstan of the apparatus. Thus, after the movement of the pressure roller lever the servo wheel ensures that by means of the second control means the pressure roller is pressed against the capstan with the appropriate force.

Another preferred embodiment of the invention is characterized in that the servo wheel has an aperture through which one of the winding spindles extends. By thus arranging the servo wheel with its aperture over the winding spindle a compact construction is obtained.

Another preferred embodiment of the invention is characterized in that the apparatus comprises a cassette holder for transferring a cassette containing the magnetic tape towards and away from the winding spindles and the sliding plate carries latching means which control a latching member for latching the cassette holder, the control of said latching means causing the cassette holder to be unlatched in the initial position of the sliding plate. This ensures that during the movement from and towards the end position and while the end position is assumed the sliding plate keeps the cassette holder latched by controlling the latching means, so that the cassette cannot be removed from the apparatus. The cassette holder is unlatched only in the initial position of the sliding plate to allow the cassette to be removed.

Another preferred embodiment of the invention is characterized in that the tape guides, the positioning means, the first control means, the second control means, the third control means, the latching means and the brake means are constructed to form an integrated unit with the sliding plate. In this way a large number of parts are integrated in the sliding plate, which parts assist in controlling the various functions of the apparatus. These parts together with the sliding plate are preferably made of a thermosetting plastics, the positions of these parts relative to each other being defined by the injection-moulding die.

Another preferred embodiment of the invention is characterized in that the sliding plate carries friction means which are pressed against one of the winding spindles in the end position of the sliding plate. Thus, with the aid of the friction means the sliding plate can also ensure that a counter-torque is exerted on the winding spindle which is not driven. This may be advantageous for keeping the magnetic tape taut.

In this respect a further preferred embodiment is characterized in that the sliding plate can be positioned in a first or a second fast-wind position between the initial position and the end position, in which respective fast-wind positions the sliding plate is situated at different distances from the drum system, and the friction means comprise two felt elements which are attached to the sliding plate, the respective felt element being pressed against one winding spindle or the other in the first fast-wind position and the second fast-wind position respectively. In this way a counter-torque is exerted selectively on the winding spindle which is not driven in the first or the second fast-wind position. As in the respective fast-wind positions the sliding plate occupies different positions relative to the drum system the respective felt element can simply be pressed in position without the use of special control means.

DETAILED DESCRIPTION OF THE PREFERRED EMBODIMENTS

Figure 1:
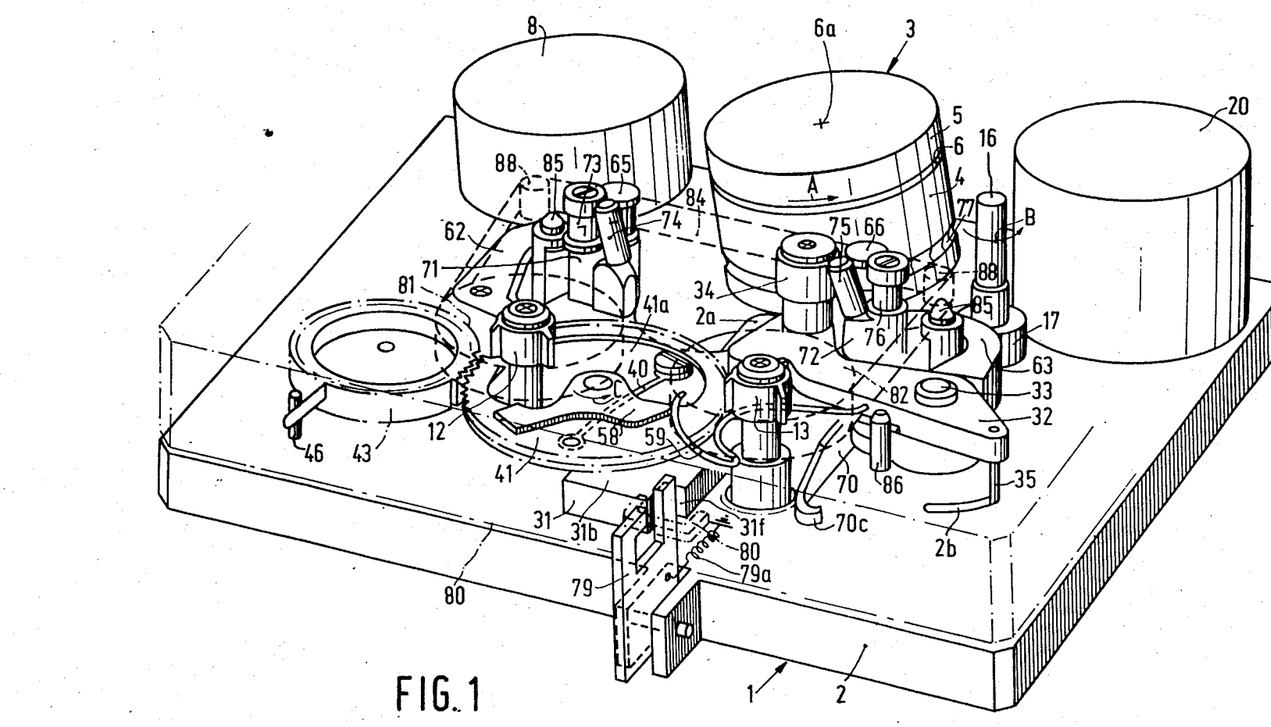
FIG. 1 is a perspective view in which the magnetic tape is shown schematically and in which the apparatus is in the stop position.

The magnetic-tape apparatus shown in FIG. 1 has a deck 1 which comprises a comparatively rigid deck plate 2 at the upper side of the apparatus. The deck plate 2 carries a cylindrical drum system 3, which comprises two stationary drum sections constituted by a lower drum 4 and an upper drum 5 (see also FIGS. 10 and 11). A head disk 6 is mounted for rotation between the lower drum and the upper drum and carries a plurality of, for example 4, magnetic heads 7 (see FIG. 10). The axis of the lower drum 4 and the upper drum 5 coincides with the axis of rotation 6a of the head disk 6. The axis of rotation 6a is inclined relative to the deck plate 2. The head disk 6 is driven by means of a motor 8, which is arranged beside the drum system 3 and whose motor shaft 8a is connected to a pulley 9 underneath the deck plate 2. The axis of the motor shaft 8a extends parallel to the axis of rotation 6a. A belt 10 is passed over the pulley 9 and over another pulley 11 which is fixedly connected to the shaft of the head disk 6. The normal direction of rotation of the head disk 6 is as indicated by the arrow A.

It is to be noted that alternatively the upper drum 5 may carry the magnetic heads 7 and may be rotatable about the axis of rotation 6a. In that case the head disk 6 may be dispensed with.

Figure 2:
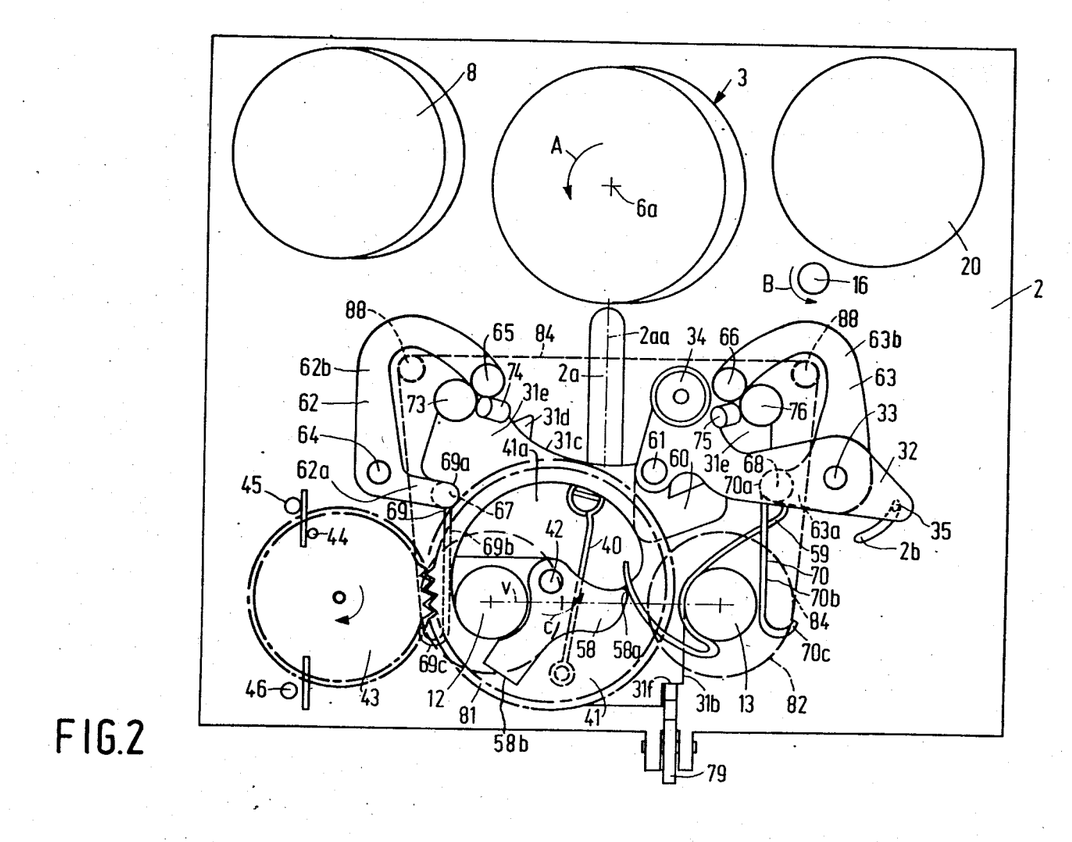
FIG. 2 is a plan view on another scale showing the apparatus of FIG. 1 in the stop position.
Figure 3:
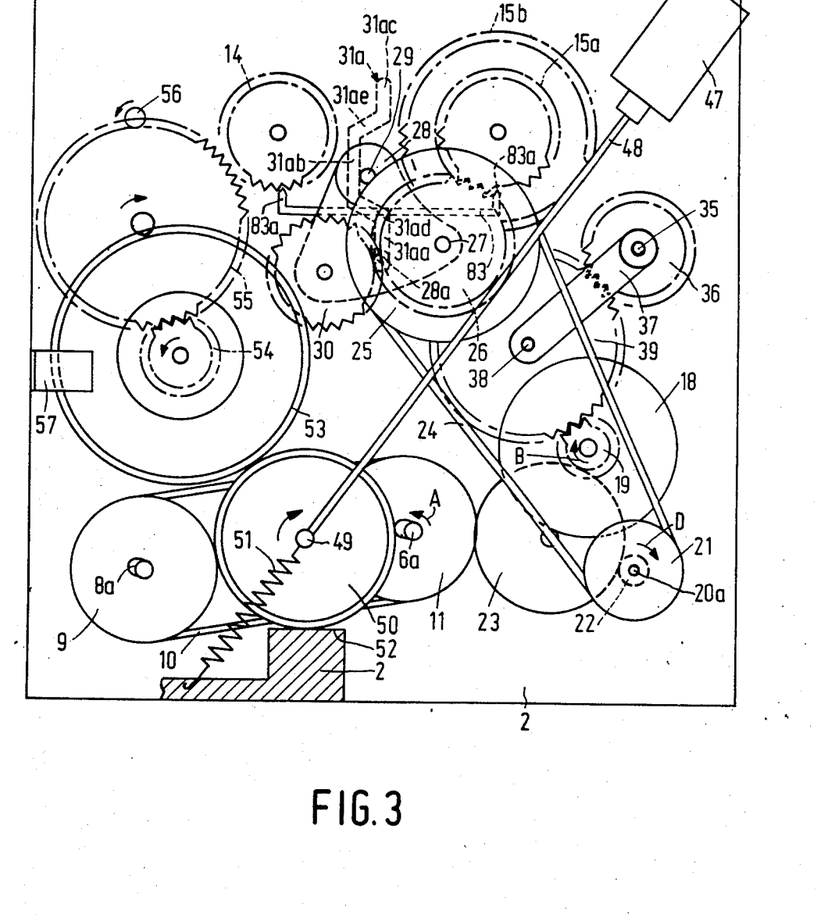
FIG. 3 is an underneath view on another scale, showing the apparatus of FIG. 1 in the stop position.

Two mutually spaced winding spindles 12 and 13 are situated above the deck plate 2 and, viewed in the plan view of FIG. 2, they are arranged substantially on the base vertices of an isosceles triangle whose apex is defined by the axis of rotation 6a. The winding spindles 12 and 13 are mounted for rotation on journals which are secured to the deck plate 2. The winding spindle 12 is connected to a fast-wind idler 14, and the winding spindle 13 is connected to a fast wind-idler 15a and a normal-mode idler 15b. The normal-mode idler 15b is connected to the winding spindle 13 by means of a friction clutch in the customary manner. It is to be noted that the idlers 14 and 15a, 15b are coaxial with the winding spindles 12 and 13 respectively and their axes extend perpendicularly to the major surface of the deck plate 2. This applies also to the axis of rotation of a capstan 16 which projects from the deck plate 2. The capstan 16 is journalled in a bearing bush 17 on the deck plate 2 and underneath the deck plate 2 it is rigidly connected to a flywheel 18 and to a gear wheel 19 (FIG. 3). For driving the capstan 16 a drive motor 20 is arranged beside the drum system 3 and comprises a motor shaft 20a carrying a pulley 21 and a gear wheel 22 underneath the deck plate 2. The gear wheel 22 drives the capstan 16 via an idler 23 in the direction indicated by the arrow B.

A belt 24 is passed over the pulley 21 and a pulley 25. The pulley 25 is rigidly connected to a gear wheel 26. The pulley 25 and the gear wheel 26 are mounted on a journal 27, which is secured to a coupling plate 28 which is pivotable relative to the deck plate 2 about a spindle 29. Further, a gear wheel 30, which is in mesh with the gear wheel 26, is journalled in the coupling plate 28.

Figure 5:
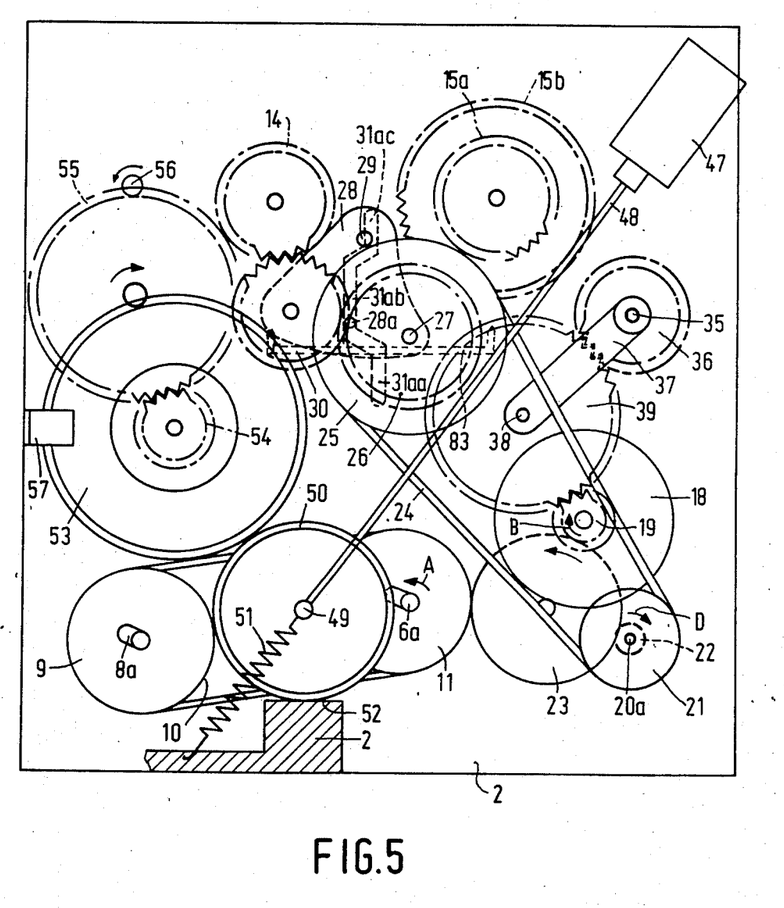
FIG. 5 is an underneath view similar to FIG. 3, showing the apparatus in the same fast-wind position as in FIG. 4.
Figure 6:
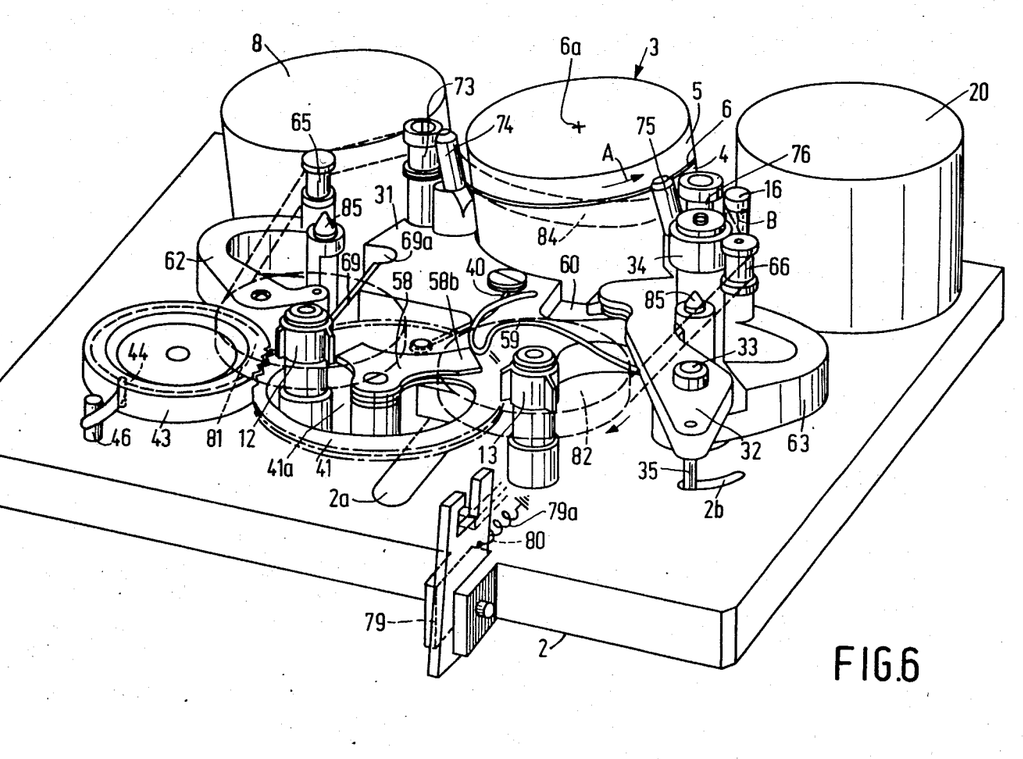
FIG. 6 is a perspective view similar to FIG. 1, showing the magnetic-tape apparatus in the normal operating position.
Figure 8:
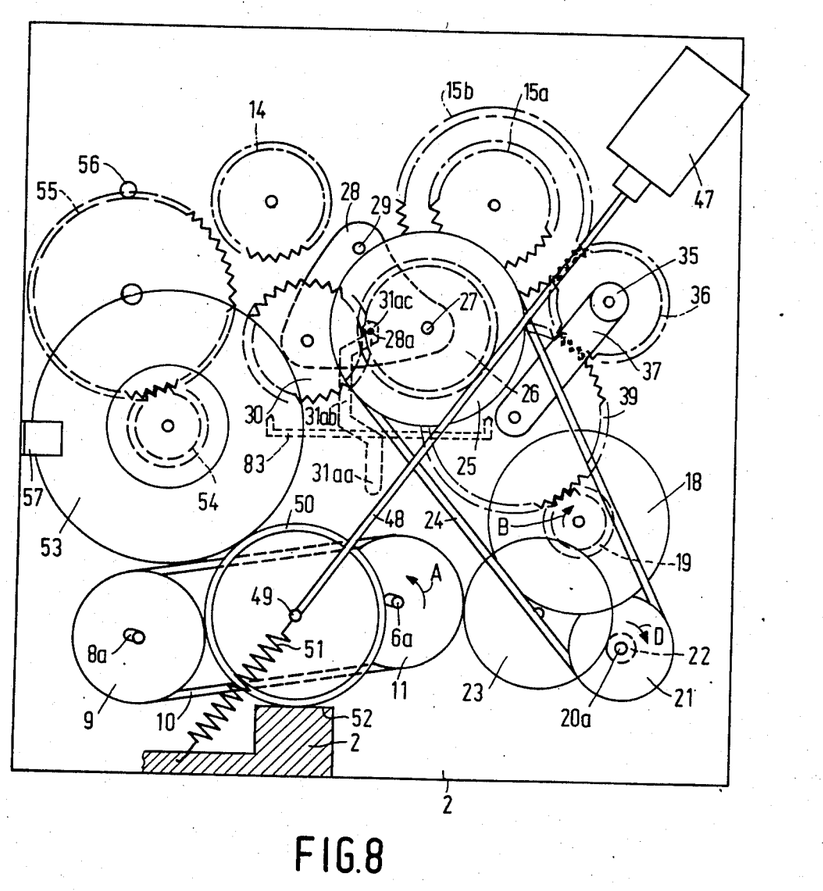
FIG. 8 is an underneath view similar to FIGS. 3 and 5 but showing the apparatus in the normal operating position.

The upper surface of the deck plate 2 carries a supporting member 31 in the form of a sliding plate which, viewed in the plan view of FIG. 2, is rectilinearly slidable in a direction perpendicular to a connecting line v between the axes of rotation of the winding spindles 12 and 13 and which for this purpose is guided in the deck plate 2 in a slot 2a, whose longitudinal axis 2aa extends perpendicularly to said connecting line v. A pin 28a extends through the slot 2a, is rigidly connected to the coupling plate 28, and is guided in a groove 31a in the lower wall of the sliding plate 31. As is shown in FIG. 3, this groove has a special shape and serves as a control means for controlling the coupling plate 28 during the movement of the sliding plate 31 away from or towards the drum system 3. As is shown in FIGS. 3, 5 and 8 the pin 28a may be situated in a branch 31aa (FIG. 3), in a branch 31ab (FIG. 5) or in a branch 31ac (FIG. 8). All these three branches extend perpendicularly to the longitudinal axis 2aa of the slot 2a, the axis of the branch 31ab being situated to the left of the axis 29 viewed in FIG. 3, the axis of the branch 31ac being situated to the right of the axis 29, and the axis of the branch 31aa being situated slightly further to the right of the axis 29. An oblique branch 31ad is situated between the branches 31aa and 31ab and an oblique branch 31ae is situated between the branches 31ab and 31ac. In the stop position of the apparatus as shown in FIG. 3 the pin 28a is situated in the right-most branch 31aa, so that the coupling plate 28 is in such a position that the gear wheel 26 is coupled to the fast-wind idler 15a. By moving the sliding plate 31 over a comparatively short distance towards the drum system 3 the gear wheel 26 remains coupled to the fast-wind idler 15a and by moving the sliding plate 31 slightly further towards the drum system the pin 28a enters the branch 31ab, as a result of which the coupling plate 28 is pivoted about the spindle 29 into the position shown in FIG. 5, in which the gear wheel 30 is in mesh with the fast-wind idler 14. In this position the gear wheel 26 has become disengaged from the fast-wind idler 15a as a result of the pivotal movement of the coupling plate 28. Finally, by a movement of the pin 28a in the branch 31ac the coupling plate 28 can be moved into a position in which both the gear wheel 26 and the gear wheel 30 are disengaged from the other wheels (FIG. 8).

A pressure-roller lever 32 is pivotable about a pivot 33 on the upper side of the deck plate 2. The pressure-roller lever 32 is constructed as a two-arm lever and at the free end of one of its arms it carries a pressure roller 34. Another arm of the lever 32 carries a pin 35 at its free end, which pin is movable in a slot 2b in the deck plate 2 (FIG. 2). As is shown in FIG. 3 the pin 35 carries a gear wheel 36 underneath the deck plate 2 (FIG. 3) and the pin is mounted on the end portion of an arm 37. The other end of the arm 37 carries a journal 38 by means of which the arm 37 is pivotable relative to the deck plate 2. A gear wheel 39 is rotatable about the journal 38 and is in mesh with the gear wheel 36 and also with the gear wheel 19. When the pressure-roller lever 32 is pivoted the arm 37 is also pivoted via the pin 35, the arm 37 being pivotable from a position shown in FIG. 3 to a position shown in FIG. 8, in which the gear wheel 36 is in mesh with the normal-mode idler 15b. In this way the motor 21 can drive the fast-wind idler 14, the fast-wind idler 15a, or the normal-mode idler 15b.

Figure 4:
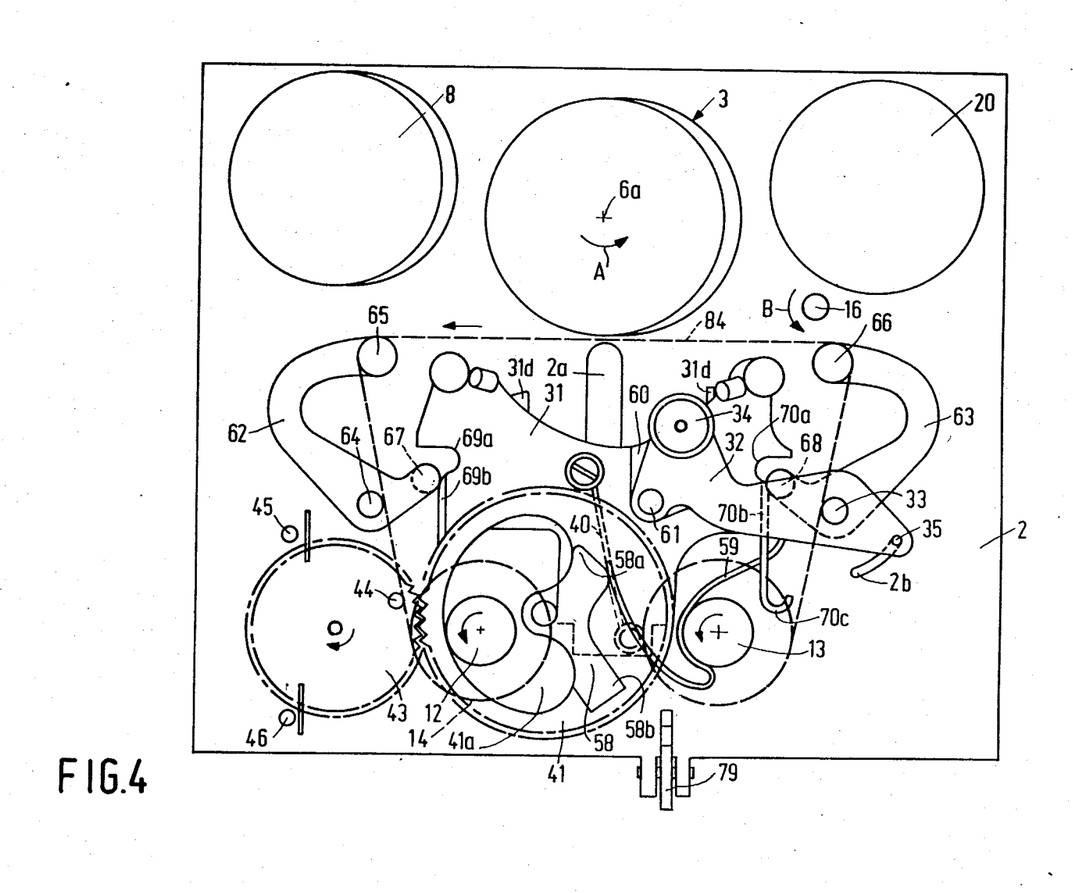
FIG. 4 is a plan view similar to FIG. 2, showing the apparatus in a fast-wind position.

Near the front side which faces the drum system 3 the sliding plate 31 is connected to a first spring coupling 40 comprising a spring, for example a blade spring, whose other end is connected to a servo wheel 41 which is also mounted on a journal 42 which is mounted for rotation in the deck plate 2. The servo wheel 41 is situated above the sliding plate 31. Thus, by means of the first spring coupling 40 the sliding plate 31 can be moved from an initial position shown in FIGS. 1 and 2 to two fast-wind positions (of which one fast-wind position is shown in FIG. 4) and also to an end position, shown in FIGS. 6, 7 and 9 to 12, which position corresponds to the normal operating position of the apparatus. The servo wheel 41 has an aperture 41a through which the winding spindle 12a extends and which aperture makes it possible for the servo wheel 41, which has a comparatively large diameter, to be situated largely between the winding spindles 12 and 13. The servo wheel 41 is in mesh with a gear wheel 43, which carries a switching pin 44 which acts against a reset switch 45 in the stop position shown in FIG. 2. In the operating position shown in FIG. 7 the switching pin 44 abuts against a reset switch 46. In a manner not shown the switches 45 and 46 are electrically connected to an electronic circuit, which also actuates an electromagnet 47 (see FIG. 3). The electromagnet 47 is connected to a switching rod 48, whose end which is remote from the electromagnet is connected to a journal 49 on which a wheel 50 is journalled. Further, the journal 49 is connected to a tension spring 51, which is situated in line with the switching rod 48 and which, viewed in FIG. 3, tends to pull the wheel 50 towards bottom left. In the stop position of the apparatus the circumference of the wheel abuts against an abutment wall 52 on the underside of the deck plate 2. If as a result of the actuation of the apparatus the electromagnet 47 is energized via the electronic circuit wheel 50 is moved to the top-right viewed in FIG. 3 against the force of the spring 51, so that a driving connection is established between the motor shaft 8a of the motor 8 and the gear wheel 53 to which the wheel 50 is coupled. The gear wheel 53 is rigidly connected to the comparatively small coaxial gear wheel 54, which is in mesh with a gear wheel 55. In its turn, the gear wheel 55 is in mesh with a gear wheel 56 which is fixedly connected to the gear wheel 43. Thus, when the electromagnet 47 is being energized, a transmission is established between the motor shaft 8a of the motor 8 and the servo wheel 41. By means of this transmission the sliding plate 31 can be shifted from the initial position to the respective fast-wind positions and to the end position, and by reversing the direction of rotation of the motor 8 the sliding plate can be moved back in a direction opposite to that indicated by the arrow A. In the end position the switching pin 44 abuts against the reset switch 46 and (as stated previously) in the initial position the pin abuts against the reset switch 45. The position of the gear wheel 53 is detected by means of a position-detection means comprising a counter 57. The counter may comprise a photocell but alternatively it may comprise a Hall element. By coupling it to the electronic circuit the counter can thus establish over which distance the sliding plate 31 has been shifted towards the drum system after starting from the position shown in FIG. 2. This is important in particular for the fast-wind positions, of which one position is shown in FIG. 4. By constructing the electronic circuit as a microprocessor the initial position and the end position of the sliding plate 31 can be detected accurately by means of the reset switches 45 and 46.

Above the sliding plate 31 the journal 42 carries a bell-crank lever 58 (see FIG. 2) having a first end 58a which in the initial position of the sliding plate is pressed against a second spring coupling of the apparatus comprising a wire spring 59. As a result of the rotation of the servo wheel 41 the second end 58b of the bell-crank lever 58 acts against the wire spring 58, so that the wire spring exerts a force on the pressure roller lever 32, thereby urging the pressure roller 34 against the capstan 16 with spring force in the position shown in FIG. 7.

In the upper wall of the sliding plate 31 a V-shaped groove 60 is formed, whose walls constitute control means for a pin 61 arranged on the pressure-roller lever 32. Thus, when the sliding plate 31 is shifted from the initial position to the end position, i.e. from the position illustrated in FIG. 2 to that in FIG. 7, the pressure roller lever 32 is moved via a position as shown in FIG. 4, in which the pin 61 is situated in the vertex of the V-shaped groove 60. Thus, the groove 60 provides an automatic guidance of the pressure-roller lever 32 with the pressure roller 34 towards the capstan 16. As a result of the coupling between the pressure-roller lever 32 and the arm 37 via the pin 35 the guidance provided by the groove 60 during the movement of the sliding plate 31 also ensure that the gear wheel 36 is brought into the position shown in FIG. 8.

Figure 7:
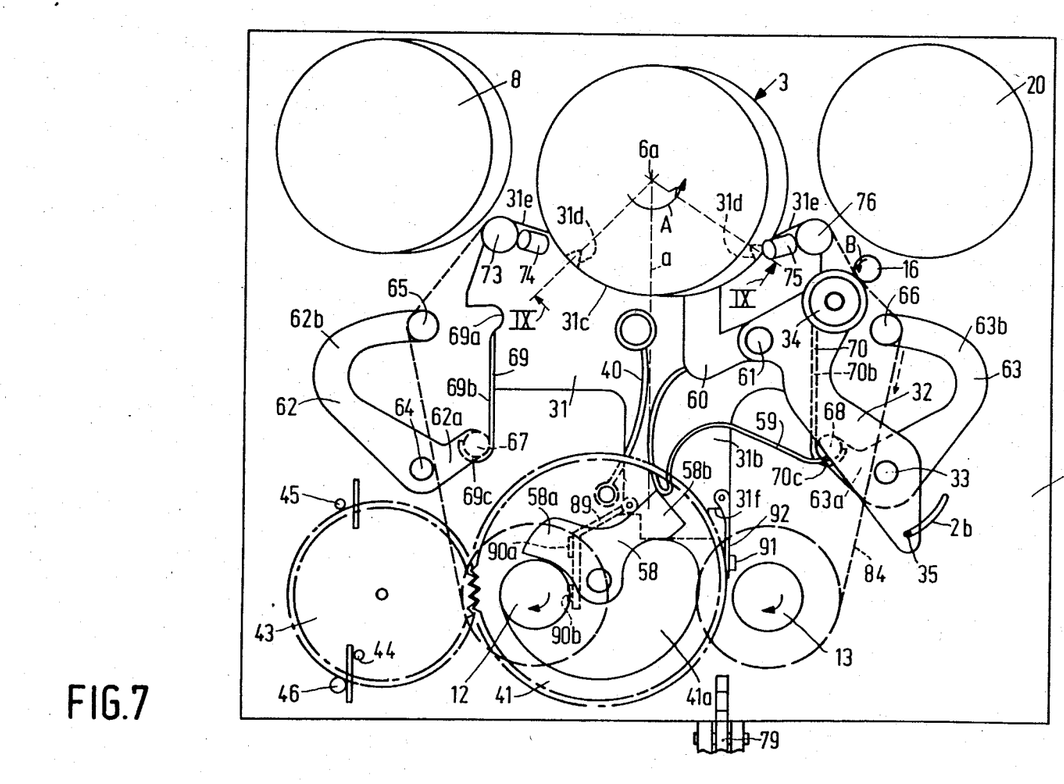
FIG. 7 is a plan view similar to FIGS. 2 and 4 but showing the apparatus in the normal operating position.

The deck plate 2 further carries two pivotal arms 62 and 63 mounted for pivotal movement, the left-hand pivotal arm 62 in FIG. 2 being pivotable about a pivot 64 and the right-hand pivotal arm 64 being pivotable about the pivot 33 together with the pressure-roller lever 32. The two pivotal arms are arranged mirror-symmetrically relative to a plane of symmetry a between the winding spindles 12 and 13 (see FIG. 7) and are spaced equidistantly from these winding spindles, the longitudinal axis 2aa of the slot 2a being contained in this plane. On opposite sides of the pivotal axis each pivotal arm comprises two arm portions 62a, 62b and 63a, 63b. At the free ends of the arm portions 62b and 63b respectively, the pivotal arms carry tape guides 65 and 66 respectively, which are each provided with a cylindrical guide surface. At the free ends the arm portions 62a and 63a carry pins 67 and 68 respectively. The sliding plate 31 is provided with control means comprising guide edges 69 and 70 respectively which are situated on the side walls of the sliding plate 31 mirror-symmetrically relative to the plane of symmetry a. As is shown in FIG. 2, the guide edges have cylindrically curved portions 69a and 70a respectively on the sides facing the drum system 3. In the positions of the pivotal arms 62 and 63 as shown in FIG. 2 (the stop position of the apparatus) the pins 67 and 68 respectively abut against the portions 69a and 70a respectively and thus occupy stable positions. Adjoining the portions 69a and 70a the guide edges have profiles 69b and 70b respectively, against which the pins abut in the position illustrated in FIG. 4, namely a fast-wind position of the apparatus. The profiles 69b and 70b comprise a straight guide portion adjoining an outwardly bent portion, and adjacent the straight portion the guide edges 69 and 70 have an outwardly bent end portion 69c and 70c respectively. These end portions together with the last parts of the straight guide portions are situated on projecting limbs of the sliding plate 31, which limbs have such dimensions that the bent end portions 69c and 70c are elastically deflexible to a small extent. As is illustrated in FIG. 7, the end portions 69c and 70c ensure a stable positioning of the guides 65 and 66 respectively in the operating position of the apparatus as illustrated in FIG. 7.

In the position illustrated in FIG. 2 the portion 31b of the sliding plate 31 is situated in the area between the two winding spindles 12 and 13. At the front side facing the drum system 3 the sliding plate further has a wall 31c which is substantially concentric with the drum system. This wall extends through an arc of approximately 90° and in the plan view of FIG. 7 stationary positioning means are arranged on the sliding plate mirror-symmetrically relative to the plane of symmetry a, which means comprise projecting portions 31d on the wall 31c near the ends of the curved portion of this wall. On opposite sides the wall 31c adjoins front portions 31e of the sliding plate which are disposed mirror-symmetrically relative to the plane of symmetry a. As is also shown in FIG. 2, these front portions 31e carry basic portions 71, 72 respectively, two tape guides 73, 74 and 75, 76 respectively being rigidly connected to each basic portion. Each tape guide has a cylindrical circumferential surface, the axes of the tape guides 73 and 76 extending substantially perpendicularly to the deck plate 2 and the axes of the tape guides 74 and 75 extending substantially parallel to the axis of rotation 6a of the head disk 6.

In the lower drum 4 there is provided a positioning element constituted by a recess in the outer wall of the lower drum 4. In the present embodiment the recess is a circumferential coaxial groove 77 in the outer wall, but as an alternative separate non-circumferential recesses may be formed in the outer wall of the lower drum 4. The advantage of the groove shape is that it can be formed easily and accurately in the outer wall of the lower drum 4. In the normal operating condition of the apparatus, in which the sliding plate 31 is in the end position, the projecting portions 31d abut against the wall of the groove 77 (see FIG. 9), so that a correct positioning of the tape guides relative to the drum system is ensured as a result of the rigid connection between the projecting portions 31d and the tape guides 73 to 76. The wire spring 40 ensures that the projecting portions 31d are pressed firmly into the groove 77. It is to be noted that in the embodiment shown in FIGS. 1–9 the portions 31d are situated at different levels relative to the deck plate 2 on account of the coaxial shape of the groove 77 (see FIG. 9). If as alternative positioning elements two recesses are formed in the outer wall of lower drum 4 at the same level the portions 31d may also be situated at the same level.

Figures 9, 10, 11:
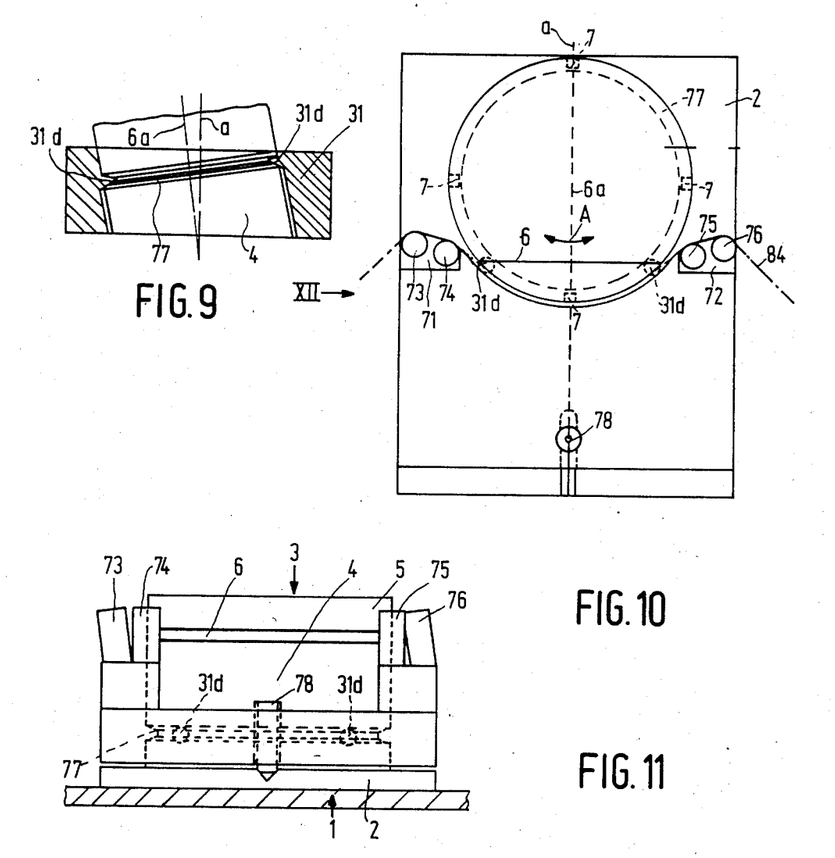
FIG. 9 shows the apparatus on another scale in a partly sectional view taken on the lines IX—IX in FIG. 7.
FIG. 10 is a schematic plan view on another scale, showing the apparatus of FIG. 1 in the normal operating position, but showing the drum system and the tape guides in other positions than in FIG. 1.
FIG. 11 is a schematic view taken on the line XI in FIG. 10.

At the rear side which is remote from the drum system the portion 31b of the sliding plate 31 may carry an adjusting element 78 comprising a set-screw whose axis is preferably situated in the plane of symmetry a (see FIG. 9). By adjusting the set-screw 78 the positions of the various tape guides can be influenced because the projecting portions 31d can be tilted in the groove 77 about the connecting line b between two portions 31d by tightening or loosening said screw. The projecting portions 31d and the groove 78 are prism-shaped in a cross-section taken perpendicularly to the deck plate 2, which is important for a smooth engagement of the walls of the projecting portions and those of the groove (see FIG. 9). Suitably, the sliding plate 31 is an integrated unit together with the projecting portions 31d and the tape guides 73, 74, 75 and 76, this unit being preferably made of a thermosetting plastics. This has the advantage that the mould used for the manufacture of this unit accurately defines the various dimensions. Thus, tolerances of the various parts of the sliding plate are minimized.

Further, the rear portion 31b of the sliding plate comprises a latching wall 31f, which actuates a latching member 79 which latches a cassette holder 80 arranged above the deck plate 2. Only a part of this cassette holder 80 is shown in FIG. 1. The latching member 79 is pivotably connected to the deck plate and is urged against the latching wall 31f by a tension spring 79 in the stop position of the apparatus. In this position of the latching member 79 the cassette holder 80 is not latched. A magnetic-tape cassette, not shown, can then be inserted into the holder 80, after which the holder is moved downwards to move the cassette with the tape reels 81 and 82 towards the deck plate 2 until the reels 81 and 82 are engaged by the winding spindles 12 and 13 respectively. For an example of such a cassette holder and the lifting device cooperating therewith reference is made to the Applicant's EP-A-0128629 (PHN.10.702, herewith incorporated by reference). Alternatively, the holder 80 may be constructed as a holder which is pivotably connected to the deck 1. By sliding the sliding plate towards the end position the latching member 79 is pivoted under the influence of the spring 79a, thereby latching the cassette holder. Thus, the sliding plate also assists in latching and unlatching the cassette holder.

As shown in FIG. 3, the lower surface of the sliding plate carries brake means 83 comprising a member with two pointed end portions 83a which engage with the teeth of the fast-wind idlers 14 and 15a in stop position. In this way the winding spindles 12 and 13 are blocked in the stop position. By moving the sliding plate towards the drum system the brake means 83 are disengaged from the fast-wind idlers, so that these idlers can be driven without any obstruction.

Figure 12:
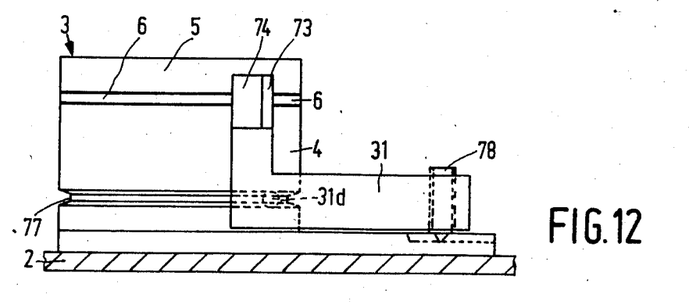
FIG. 12 is a schematic view taken on the line XII in FIG. 10.

Alternatively, the axis of the drum system 3 and the axis of rotation 6a of the head disk 6 may extend perpendicularly to the deck plate 2, which situation is illustrated in FIGS. 10–12. The tape guides 74 and 75 should then also occupy perpendicular positions and the tape guides 73 and 76 should be inclined. In the case of corresponding oblique positions of the tape guides 65 and 66 and the magnetic-tape cassette, the path of the magnetic tape 84 around the drum system 3 will then be similar to the situation illustrated in FIGS. 1–9. An advantage of this alternative construction is that the projecting portions 31d of the sliding plate 31 can be situated at the same level relative to the deck plate 2.

Before the magnetic tape apparatus in accordance with the invention can be put into use a magnetic-tape cassette with tape reels 81 and 82 should be made to engage the winding spindles 12 and 13 by means of the cassette holder. The magnetic-tape cassette used here is for example of the kind disclosed and described in U.S. Pat. No. 4,576,345 herewith incorporated by reference. After lowering of the cassette it is positioned on spring-loaded locating pins 85, of which one pin is shown in FIG. 1. The magnetic tape 84 contained on the reels 81 and 82 extends over tape guides 88 of the cassette, which are shown schematically in FIGS. 1 and 2. After application of the magnetic-tape cassette the tape guides 65 and 66, the pressure roller 34, and the tape guides 73, 74, 75 and 76 are separated from the drum system 3 by the front part of the magnetic tape 84. This is possible because the cassette housing is constructed in such a way that space is available for taking up said parts. In this respect it is important that as a result of the action of the first control means 69, 70 the tape guides 65 and 66 occupy the correct positions and also that as result of the action of the second control means 60 the pressure-roller lever is pressed against a stop 86 (FIG. 1) and thereby keep the pressure roller 34 positioned correctly. In this stop position the magnetic tape is clear of the pressure roller 34, the tape guides 65, 66 and the tape guides 73 to 76.

When the apparatus is actuated the motor 8 is started, causing the head disk 6 to rotate in the direction indicated by the arrow A. If the electromagnet 47 is now energized this has the result that in the manner described above the servowheel 41 begins to rotate in a direction as indicated by the arrow C, causing the brake means 83 to become disengaged from the fast-wind idlers 14 and 15a, the cassette holder 80 to be latched, the pin 28a to be guided in the branch 31aa and to remain in this branch for the time being, and the pivotal arms 62 and 63 to be pivoted as a result of the guide edges 69 and 70 respectively, so that the magnetic tape 84 is taken over from the guides 88 by the tape guides 65 and 66 but remains clear of the drum system 3 and, as the pin 61 traverses the first branch of the V-shaped groove 60, the pressure roller 32 remains situated against the stop 86 in its initial position. Depending on the selected actuating button of the apparatus the sliding plate is now moved into a position in which the pin 28a is still situated in the branch 31aa or the sliding plate 31 is moved slightly further into the position as shown in FIGS. 4 and 5, in which the pin 28a is situated in the branch 31ab. In the first fast-wind position the gear wheel 26 meshes with the fast-wind idler 15a as shown in FIG. 3, whilst in the second fast-wind position the gear wheel 30 is in mesh with the fast-wind idler 14. Thus, in the first fast-wind position the magnetic tape 84 is wound rapidly towards the winding spindle 13 and in the second fast-wind position shown in FIGS. 4 and 5 it is wound towards the winding spindle 12. Fast winding is achieved in that at the end of the movement of the sliding plate 31, after the energization of the electromagnet 47 and after the rotation of the servo wheel 41 has consequently stopped, the drive motor 20 is started, causing the pulley 21 to rotate in the direction indicated by the arrow D. This rotation causes the capstan 16 to rotate in the direction indicated by the arrow B, but in this position, as stated previously, the magnetic tape is clear of the pressure roller 34 and the capstan 16. For fast winding it is important that as a result of the shape of the cassette housing the magnetic tape 84 between the wheels 81 and 82 is not in contact with any parts of the cassette housing (such as the guides 88). During fast winding the tape path is influenced only by the tape guides 65 and 66. The correct position of the sliding plate 31 for fast winding in either direction is determined by the position-detection means 57 which cooperates with the gear wheel 53. However, it is to be noted that this position can also be detected in another manner, for example by means of wiper contacts which directly detect the position on the sliding plate 31.

If as a result of the energization of the electromagnet 47 the sliding plate is moved from the initial position into the end position as shown in FIGS. 6 to 12, the V-shaped groove 60 causes the pressure-roller lever 32 to be pivoted to the end position, and under the influence of the spring 59 the pressure roller 34 is pressed against the capstan 16 (see FIG. 7). During this pivotal movement the arm 37 is pivoted via the pin 35, so that the gear wheel 36 is in mesh with the normal-mode idler 15b and the tape is wound onto the winding spindle 13 via the winding friction, not shown. When the sliding plate 31 is moved to the end position it is important that the magnetic tape 84, which has initially been led out of the housing by the guides 65 and 66, is now further guided by the tape guides 73 and 76 and is wrapped around the drum system through an angle of approximately 90°. This operation is referred to as "threading-in" of the magnetic tape. At the end of the movement the tape guides 74 and 75 play an important part in this operation. As a result of the inclination of the axis of rotation 6a and of the axis of the drum system the tape is now wrapped around the wall of the drum system along a helical path. This enables inclined tracks to be recorded on or to be read from the magnetic tape 84 by means of the magnetic heads 7 as the head disk 6 rotates. If the tape is thus wrapped around the drum system it is important that the tape guides 73 to 76 are aligned accurately relative to the drum system. This is achieved by means of the projecting portions 31d in conjunction with the groove 77 in the lower drum 4. This provides a very accurate yet easy-to-realize positioning of said portions. In this respect it is important that the portions 31d and the groove 77 are prism-shaped, so that during the engagement of these portions with the groove wall they are automatically aligned correctly relative to each other (see FIG. 9). In addition, the tape path may be corrected by means of the set screw 78, but if accurately manufactured parts, for example injection-moulded parts, are employed this adjustment may be omitted. The end position of the servo wheel 41 is defined in that the switching pin 44 on the gear wheel 43 abuts against the reset switch 46. In this end position the servo wheel 41 presses the projecting portions 31d firmly into the groove 77 via the spring 40, and the spring 59 exerts such a pressure on the pressure-roller lever 32 that the pressure roller 34 is pressed against the capstan 16 with a predetermined force. At this instant the apparatus is in the normal operating position and the signals can be recorded or read.

It is to be noted that the sliding plate 31 may also carry a resilient arm 89 (FIG. 7) provided with friction means comprising two mutually spaced felt elements 90a and 90b, which can each be pressed against the winding spindle 12, in order to exert a counter-torque on the winding spindle 12 to keep the tape taut when the magnetic tape 84 is unwound. In the first fast-wind position the felt element 90a is pressed against the winding spindle 12 and in the normal operating position the felt element 90b is pressed against this spindle. The position of the felt element 90a relative to the sliding plate 31 is such that their second fast-wind position, when the tape is taken up by means of the winding spindle 12, this felt element 90a is clear of the winding spindle. Only in the second fast wind position a felt element 91 arranged on a resilient arm 92 on the sliding plate 31 is pressed against the winding spindle 13 to exert a counter-torque on this winding spindle. This selective application of the felt elements is possible by moving the sliding plate 31 to the various positions.

In addition to the correct positioning of the tape guides 73 to 76 relative to a drum system 3 the magnetic-tape apparatus in accordance with the invention has the advantage that the sliding plate 31 can be integrated with various parts required for controlling the various apparatus functions. As described hereinbefore, the sliding plate 31 is integrated with means for controlling the drive of the winding spindles, controlling the pressure-roller lever, controlling pivotal arms carrying tape guides, controlling the brake means, controlling a latching means for the cassette holder, and automatically positioning the tape guides. Further, the sliding plate 31 may carry the friction means for exerting a counter-torque on the respective winding spindle. A great advantage of this is that the control logic of the apparatus is locked directly to the position of the sliding plate 31. Thus, in each position of the sliding plate the tape guides occupy positions which correspond accurately to the selected apparatus function. This makes the magnetic-tape apparatus in accordance with the invention suitable for many uses and renders the apparatus very suitable for mass production. One possible use is the recording and/or reproduction of digital audio signals, for which a compact magnetic-tape apparatus is desirable.

It is to be noted that alternatively the servo wheel 41 may be driven by a separate motor, in which case the electromagnet 47 and the wheel 50 and the wheels driven thereby may be dispensed with. This separate motor is switched on and off and, as the case may be, its direction of rotation is reversed by the electronic circuit.

What is claimed is:

1. A magnetic-tape apparatus comprising a deck carrying a cylindrical drum system provided with at least one rotatable magnetic head, on which deck a sliding plate carrying at least two mutually spaced first tape guides is guided for rectilinear movement towards and away from the drum system, a movement of the sliding plate from an initial position towards the drum system causing a length of magnetic tape to be led towards the drum system, after which movement when the sliding plate is in an end position the magnetic tape is wrapped around a part of the circumference of the drum system by said first tape guides, which deck also carries two mutually spaced winding spindles for winding and unwinding the magnetic tape respectively, characterized in that the sliding plate is provided with positioning means which position the first tape guides relative to the drum system in the end position of the sliding plate, first control means which control two pivotal arms which are arranged on the deck and which carry second tape guides, second control means which control a pressure-roller lever which is arranged on the deck and which carries a pressure roller, and third control means which control an idler wheel for driving a first winding spindle or a second winding spindle.

2. A magnetic-tape apparatus as claimed in claim 1, characterized in that the sliding plate carries friction means which are pressed against one of the winding spindles in the end position of the sliding plate.

3. A magnetic-tape apparatus as claimed in claim 1, characterized in that the third control means comprise a control groove in the lower wall of the sliding plate, a pin which is coupled to the idler wheel being guided in said control groove.

4. A magnetic-tape apparatus as claimed in claim 1 characterized in that the second control means comprise a V-shaped groove in an upper wall of the sliding plate.

5. A magnetic-tape apparatus as claimed in claim 1, characterized in that the first control means comprise two facing guide edges on the sliding plate, which guide edges each comprise a curved end portion adjoining a straight guide portion.

6. A magnetic-tape apparatus as claimed in claim 1, characterized in that the sliding plate carries brake means which are coupled to the winding spindles at least in the initial position of the sliding plate.

7. A magnetic-tape apparatus as claimed in claim 1, characterized in that the apparatus comprises a cassette holder for transferring a cassette containing the magnetic tape towards and away from the winding spindles and the sliding plate carries latching means which control a latching member for latching the cassette holder, the control of said latching means causing the cassette holder to be unlatched in the initial position of the sliding plate.

8. A magnetic-tape apparatus as claimed in claim 1, characterized in that in the initial position the sliding plate is situated at least partly in the area between the two winding spindles and at the front side which faces the drum system the sliding plate comprises a wall which is substantially concentric with the drum system.

9. A magnetic-tape apparatus as claimed in claim 8, characterized in that the positioning means comprise two projecting portions on that wall of the sliding plate which faces the drum system, which positioning means are adapted to cooperate with at least one recess formed in a drum system.

10. A magnetic-tape apparatus as claimed in claim 8, characterized in that bearing means of a servo wheel is situated in the area between the two winding spindles, which servo wheel is elastically coupled to the sliding plate via a first spring coupling for moving the sliding plate.

11. A magnetic-tape apparatus as claimed in claim 10, characterized in that the servo wheel has an aperture through which one of the winding spindles extends.

12. A magnetic-tape apparatus as claimed in claim 10, characterized in that the servo wheel can be driven by the drive means of the drum system via an engageable and disengageable idler wheel system.

13. A magnetic-tape apparatus as claimed in claim 12 characterized in that one wheel of the idler-wheel system cooperates with a position-detection element for detecting the position of the sliding plate relative to the drum system.

14. A magnetic-tape apparatus as claimed in claim 10, characterized in that the servo wheel is elastically coupled to the pressure-roller lever via a second spring coupling, which second spring coupling at least at the end of the movement of the sliding plate towards the end position exerts a force on the pressure-roller lever to press the pressure roller against the capstan of the apparatus.

15. A magnetic-tape apparatus as claimed in claim 14, characterized in that the servo-wheel carries a bell-crank lever which cooperates with the second spring coupling.

16. A magnetic-tape apparatus as claimed in claim 15, characterized in that the servo wheel has an aperture through which one of the winding spindles extends.

17. A magnetic-tape apparatus as claimed in any one of the preceding claims, characterized in that via a coupling between the pressure-roller lever and a normal-mode idler the second control means also control said idler to drive one of the winding spindles.

18. A magnetic-tape apparatus as claimed in claim 17, characterized in that the apparatus comprises a cassette holder for transferring a cassette containing the magnetic tape towards and away from the winding spindles and the sliding plate carries latching means which control a latching member for latching the cassette holder, the control of said latching means causing the cassette holder to be unlatched in the initial position of the sliding plate.

19. A magnetic-tape apparatus as claimed in claim 18, characterized in that the sliding plate carries brake means which are coupled to the winding spindles at least in the initial position of the sliding plate.

20. A magnetic-tape apparatus as claimed in claim 19, characterized in that the tape guides, the positioning means, the first control means, the second control means, the third controls means, the latching means and the brake means are constructed to form an integrated unit with the sliding plate.

21. A magnetic-tape apparatus as claimed in claim 19, characterized in that the positioning means comprise two projecting portions on that wall of the sliding plate which faces the drum system, which positioning means are adapted to cooperate with at least one recess formed in a drum system.

22. A magnetic-tape apparatus as claimed in claim 21, characterized in that the first control means comprise two facing guide edges on the sliding plate, which guide edges each comprise a curved end portion adjoining a straight guide portion.

23. A magnetic-tape apparatus as claimed in claim 22, characterized in that the curved end portion is elastically deflexible relative to the sliding plate.

24. A magnetic-tape apparatus as claimed in claim 23, characterized in that the second control means comprise a V-shaped groove in an upper wall of the sliding plate.

25. A magnetic-tape apparatus as claimed in claim 24, characterized in that the third control means comprise a control groove in the lower wall of the sliding plate, a pin which is coupled to the idler wheel being guided in said control groove.

26. A magnetic-tape apparatus as claimed in claim 25, characterized in that the first tape guides, the positioning means, the first control means, the second control means, the third control means, the latching means and the brake means are constructed to form an integrated unit with the sliding plate.

27. A magnetic-tape apparatus as claimed in claim 26, characterized in that the servo wheel can be driven by the drive means of the drum system via an engageable and disengageable idler wheel system.

28. A magnetic-tape apparatus as claimed in claim 27, characterized in that one wheel of the idler-wheel system cooperates with a position-detection element for detecting the position of the sliding plate relative to the drum system.

29. A magnetic-tape apparatus as claimed in claim 28, characterized in that the sliding plate carries friction means which are pressed against one of the winding spindles in the end position of the sliding plate.

30. A magnetic-tape apparatus as claimed in claim 29, characterized in that the sliding plate can be positioned in a first or a second fast-wind position between the initial and the end position, in which respective fast-wind positions the sliding plate is situated at different distances from the drum system, and the friction means comprise two felt elements which are attached to the sliding plate, the respective felt element being pressed against one winding spindle or the other in the first fast-wind position and the second fast-wind position respectively.

* * * * *